(12) United States Patent
Hartmann

(10) Patent No.: US 8,417,814 B1
(45) Date of Patent: Apr. 9, 2013

(54) APPLICATION QUALITY OF SERVICE ENVELOPE

(75) Inventor: Alfred C. Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 2838 days.

(21) Appl. No.: 10/948,811

(22) Filed: Sep. 22, 2004

(51) Int. Cl.
*G06F 15/173* (2006.01)

(52) U.S. Cl. ............................ 709/225; 709/229; 726/14

(58) Field of Classification Search .................. 709/224, 709/238; 702/182; 370/230.1, 385.53
See application file for complete search history.

(56) References Cited

U.S. PATENT DOCUMENTS

| | | | | |
|---|---|---|---|---|
| 6,463,470 | B1 * | 10/2002 | Mohaban et al. | 709/223 |
| 7,233,843 | B2 * | 6/2007 | Budhraja et al. | 700/291 |
| 7,308,714 | B2 * | 12/2007 | Bardsley et al. | 726/23 |
| 2002/0040396 | A1 * | 4/2002 | Yoshihara et al. | 709/225 |
| 2002/0152305 | A1 * | 10/2002 | Jackson et al. | 709/224 |
| 2003/0051026 | A1 * | 3/2003 | Carter et al. | 709/224 |
| 2003/0145226 | A1 * | 7/2003 | Bruton et al. | 713/201 |
| 2003/0225549 | A1 * | 12/2003 | Shay et al. | 702/182 |
| 2005/0071450 | A1 * | 3/2005 | Allen et al. | 709/223 |
| 2005/0265233 | A1 * | 12/2005 | Johnson et al. | 370/229 |
| 2006/0072583 | A1 * | 4/2006 | Sanda et al. | 370/395.53 |
| 2006/0173992 | A1 * | 8/2006 | Weber et al. | 709/224 |

OTHER PUBLICATIONS

Williamson, Throttling Viruses: Restricting Propagation to Defeat Malicious Mobile Code, ACSAC Conference Dec. 2002, Dec. 10, 2002, eight (8 )pages.

Andersen et al., Changes to Functionality in Microsoft Windows XP Part 2: Network Protection Technologies, Nov. 4, 2004 [Retrieved Dec. 13, 2004] Retrieved from the Internet<URL: http://www.microsoft.com//technet/prodtechnol/winxppro/maintain/sp2netwk.mspx.

* cited by examiner

*Primary Examiner* — Greg C Bengzon
(74) *Attorney, Agent, or Firm* — Fenwick & West LLP

(57) ABSTRACT

A managed node executes one or more applications. The applications utilize the resources of the node. A quality-of-service (QoS) agent on the managed node enforces a QoS policy for the node. The QoS agent characterizes an application's usage of the node's resources and predicts its future usage. The QoS agent analyzes the predicted resource usage in view of the QoS policy and generates a QoS envelope for the application. The QoS envelope specifies a ceiling on the level of resources that can be used by the application. The QoS agent queues and meters usage above the ceiling specified by the QoS envelope. A security module determines variations between predicted and actual resource usage and generates security events if warranted.

26 Claims, 5 Drawing Sheets

APPLICATION QUALITY OF SERVICE ENVELOPE

BACKGROUND OF THE INVENTION

1. Field of the Invention

This invention pertains in general to managing resources in a computer system and in particular to managing resources to conform with a Quality-of-Service (QoS) policy and provide computer security.

2. Description of the Related Art

A large data center can have hundreds or thousands of separate computers operating together to fulfill the processing needs of the data center. For example, the data center of an enterprise such as a large e-commerce site on the Internet typically has thousands of servers divided into different tiers. Servers in a web services tier operate the web servers that provide the user interface to customers of the site. Servers in an application tier operate the business logic that allows customers to shop on the site. Servers in a data tier provide database processing.

Managing and monitoring the operations of the computers in the data center is a significant problem. In typical configurations, each computer operates an operating system, each operating system executes one or more applications, and each application executes one or more threads. The resources of the computer must be allocated to the applications and threads in an efficient manner. Even small inefficiencies in resource allocation can have significant effects when multiplied by the large number of computers in the data center.

Moreover, computers and networks like those in a data center are susceptible to a variety of malicious software including worms and viruses. For example, a malicious end-user or automated software can exploit a flaw in an application run by a computer and introduce malicious software into the data center, where it can spread rapidly. The malicious software can destroy data, change configuration settings, spy on activities and capture data, and/or perform other malicious actions. There are security tools that seek to prevent malicious software from compromising computers. However, such tools can generate false positive results and block applications from performing legitimate functions, thereby resulting in a greater administrative overhead for the data center.

Therefore, there is a need for a way to effectively and efficiently allocate the resources of a computer system. There is also a need for a way to protect computers and networks from malicious software without increasing the administrative overhead resulting from false positives and the like.

BRIEF SUMMARY OF THE INVENTION

The above needs are met by using a quality-of-service (QoS) envelope. A managed node executes one or more applications. The applications utilize the resources of the node. A QoS agent on the managed node enforces a QoS policy for the node. The QoS agent characterizes an application's usage of the node's resources and predicts its future usage. The QoS agent analyzes the predicted resource usage in view of the QoS policy and generates a QoS envelope for the application. The QoS envelope specifies a ceiling on the level of resources that can be used by the application. The QoS agent queues and meters usage above the ceiling specified by the QoS envelope. A security module determines variations between predicted and actual resource usage and generates security events if warranted.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
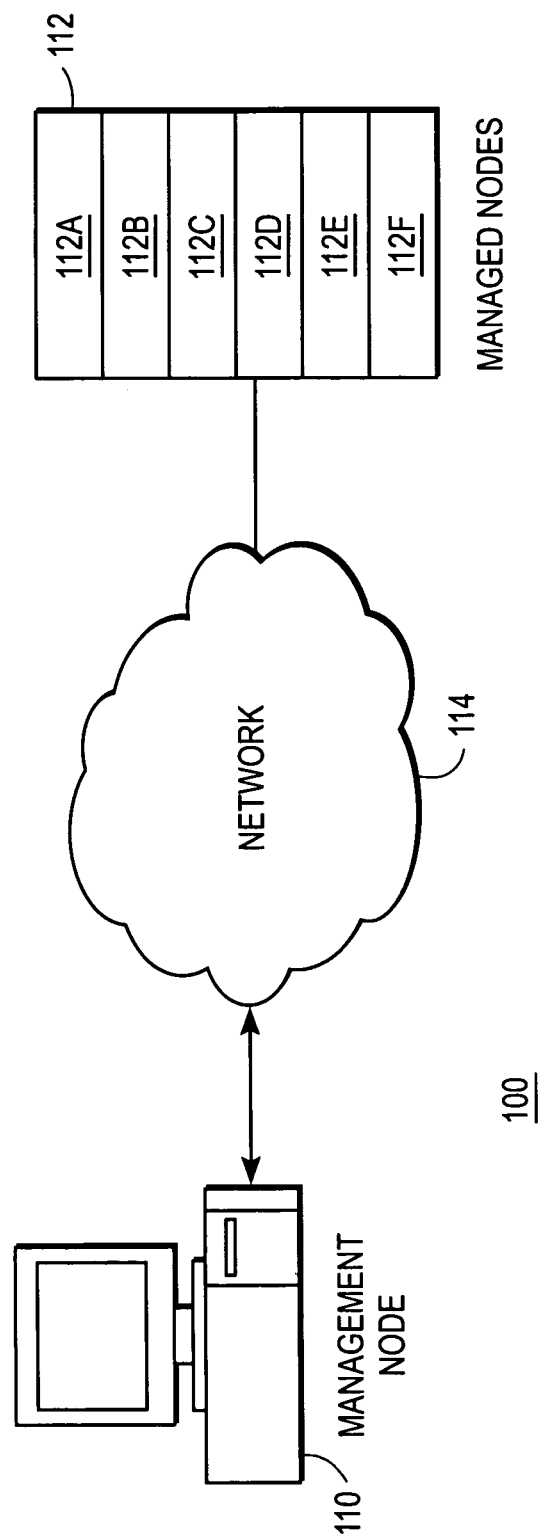
FIG. 1 is a high-level block diagram illustrating an environment utilizing an application quality-of-service (QoS) envelope according to an embodiment of the present invention.

FIG. 1 is a high-level block diagram illustrating an environment 100 utilizing an application quality-of-service (QoS) envelope according to an embodiment of the present invention. The environment includes a management node 110 in communication with multiple managed nodes 112 via a network 114. In one embodiment, the illustrated environment 100 is within an enterprise such as a business, educational institution, governmental agency, or non-profit group. For example, the environment 100 can be within a data center operated by an e-commerce business that sells products and/or services on the Internet.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral.

In one embodiment, the management node 110 is a computer for managing the operation of the managed nodes 112. To this end, the management node 110 executes one or more special purpose applications for controlling the behaviors of the managed nodes 112. In one embodiment, an administrator uses the management node 110 to allocate resources of the managed nodes 112 in accordance with a business policy of the enterprise. For example, the administrator can use the management node 100 to allocate the resources of the managed nodes 112 to implement a web store for an e-commerce retailer. The administrator also uses the management node 110 to view statistics and any security alerts or other messages pertaining to the managed nodes 112.

In one embodiment, the managed nodes 112 are computers for performing data processing under the management of the management node 110. In one embodiment, the managed nodes 112 are modular computers called "blade servers" that are designed to allow multiple computers to fit in a rack or other confined space. FIG. 1 illustrates six managed nodes, labeled 112A-F, but embodiments of the environment 100 can have hundreds or thousands of managed nodes. In another embodiment, some or all of the managed nodes are standard personal computers. In one embodiment, the management node 110 is a managed node 112 executing special purpose program modules for controlling the other managed nodes. In another embodiment, the management node 110 is distinct from the managed nodes 112.

The network 114 enables communications between the management node 110 and the managed nodes 112. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 114 can also include links to other networks such as the Internet.

Figure 2:
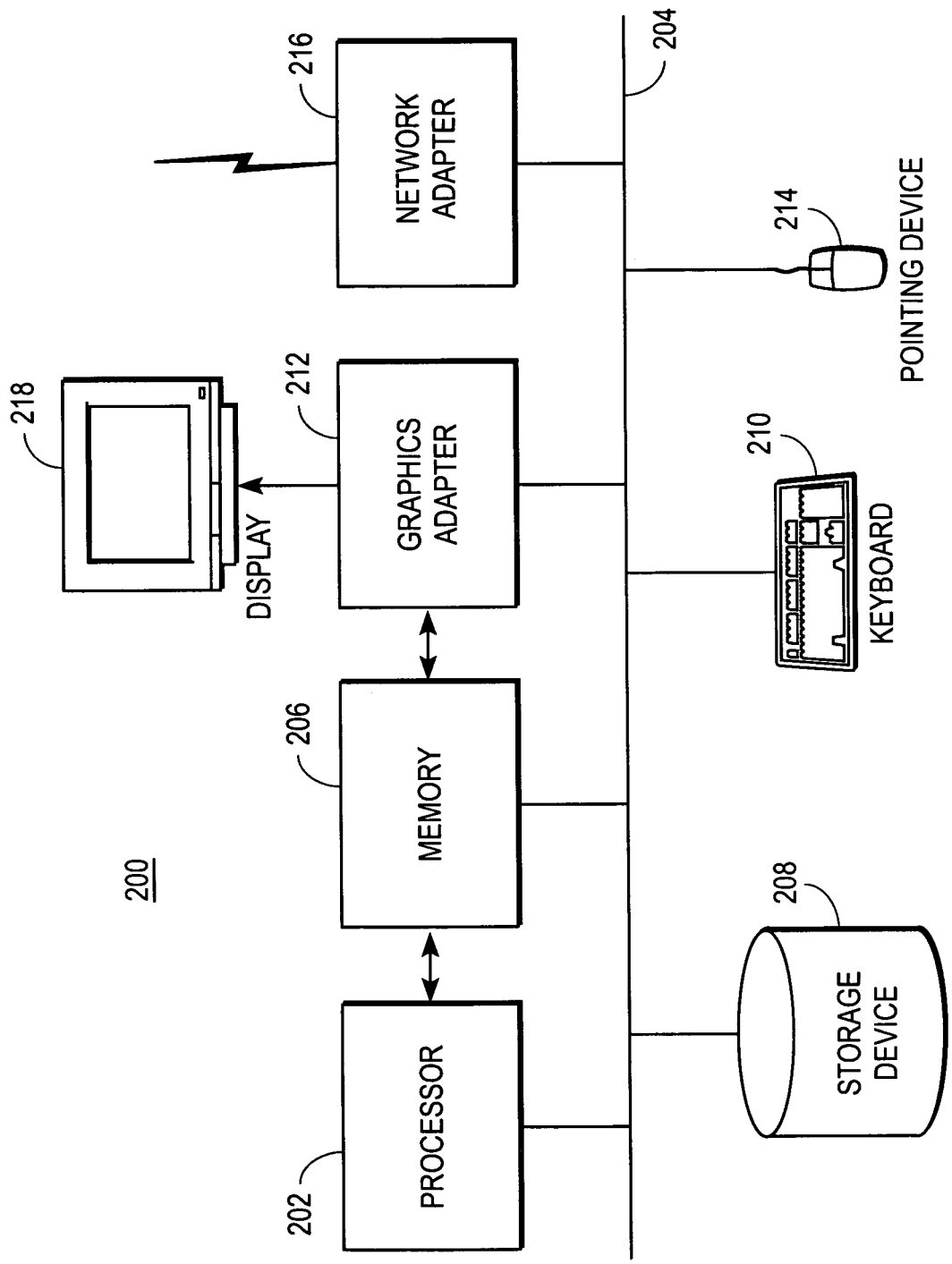
FIG. 2 is a high-level block diagram of a computer for acting as a management node and/or a managed node according to one embodiment.

FIG. 2 is a high-level block diagram of a computer 200 for acting as a management node 110 and/or a managed node 112 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The storage device 208 may comprise a computer-readable storage medium. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a managed node 112 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The computer 200 has various resources that are utilized by the modules. In one embodiment, the available resources are divided into three major classes: network resources, platform resources, and storage resources. The network resources generally correspond to the capabilities and/or usages of the network adapter 216 and associated control modules. The network resources include connections to other computers on the network 114, network bandwidth, etc. In one embodiment, the platform resources generally correspond to the capabilities and/or usages of the processor 202 and/or memory 206. The platform resources include the processing capabilities of the processor, the available memory, etc. In one embodiment, the storage resources generally correspond to the capabilities and/or usages of the storage device 208. The storage resources include the connections to the storage device 208, the bandwidth to the storage device, etc.

Figure 3:
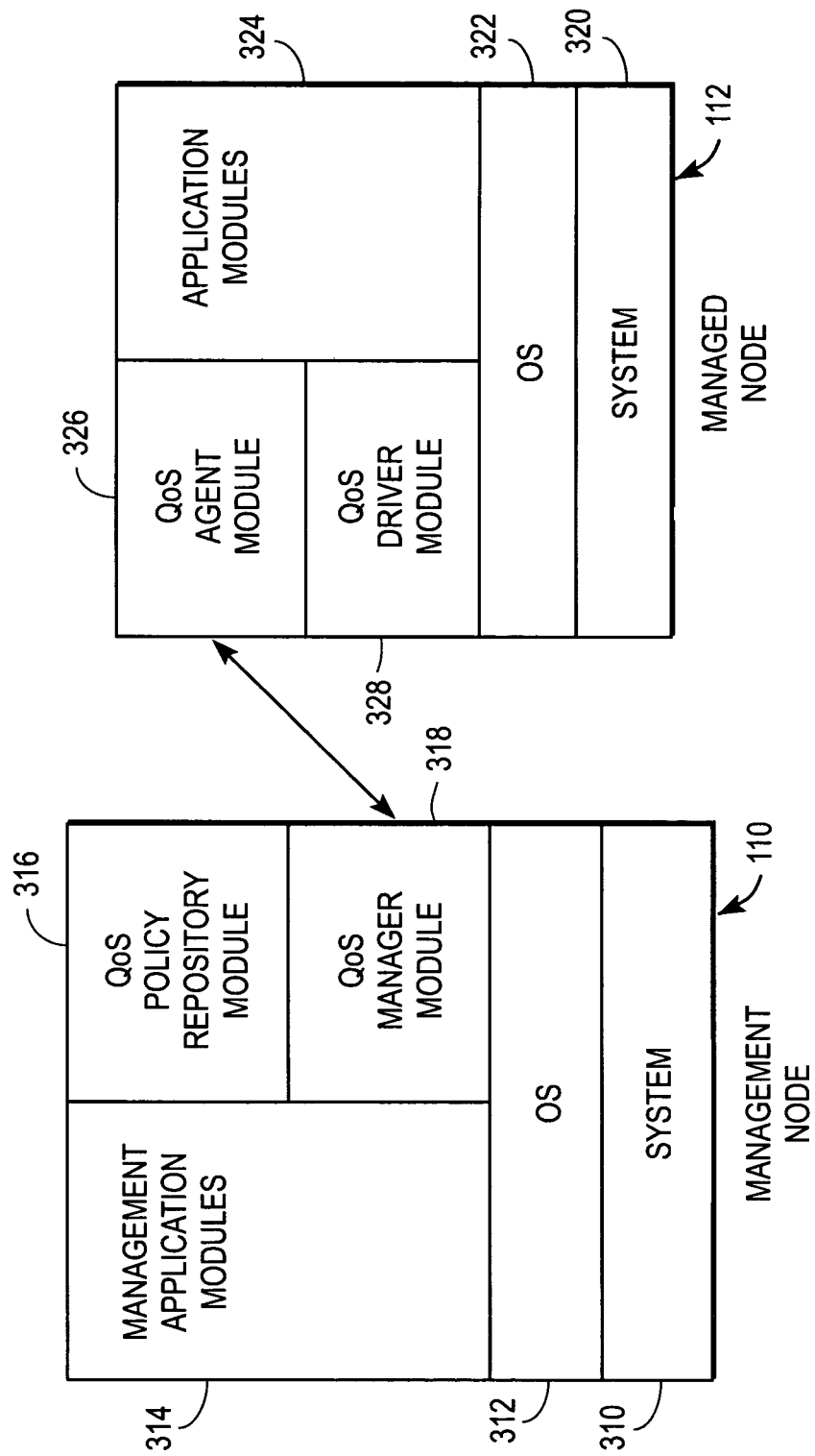
FIG. 3 is a high-level view showing details of a management node and a managed node in communication via the network according to one embodiment.

FIG. 3 is a high-level view showing details of a management node 110 and a managed node 112 in communication via the network 114 according to one embodiment. The management node 310 includes a system layer 310 that generally corresponds to the computer 200 illustrated in FIG. 2. The other elements within the management node 110 execute on the system layer 310.

The management node 110 includes an operating system (OS) module 312. The OS 312 controls the operation of the applications 314 and other modules that execute on the management node 110. Thus, the OS 312 serves as an abstraction layer between the applications 314 and the system layer 310. In one embodiment, the OS module 312 executes an industry standard OS, such as WINDOWS SERVER or WINDOWS XP from Microsoft Corp. of Redmond, Wash., SOLARIS from SUN MICROSYSTEMS of Santa Clara, Calif., and/or LINUX.

In one embodiment, the management node 310 includes one or more management application modules 314. In one embodiment, the management applications 314 are applications for managing a data center comprised of multiple managed nodes 112. An administrator or other end-user can use the management applications 314 to view information about, and control the operation of, the managed nodes 112. In one embodiment, the management applications 314 can include OPENVIEW from Hewlett-Packard of Palo Alto, Calif., and/or TIVOLI from IBM Corp. of Armonk, N.Y.

In one embodiment, a QoS policy repository module 316 stores one or more QoS policies. In general, a QoS policy furthers a business goal by providing rules expressing relative priorities of applications executed by the managed nodes 112. A QoS policy can also specify specific resource constraints for applications and/or managed nodes 112. The terms specified by a QoS policy can vary based upon the current business environment, time of day or date, amount of resources available, etc.

In one embodiment, a QoS manager module 318 accesses the QoS policies in the QoS policy repository 316 and applies certain policies to certain ones of the managed nodes 112. In one embodiment, the QoS manager module 318 provides a user interface (UI) with which an administrator or other end-user can interact in order to create, view, and modify the QoS policies in the repository 316. In addition, the administrator can select a QoS policy and apply it to one or more of the managed nodes 112. In one embodiment, the QoS manager 318 provides an application programming interface (API) through which the management applications 314 can access the functionality of the QoS manager.

Turning now to the managed node 112, the managed node also has a system layer 320 that generally corresponds to the computer 200 illustrated in FIG. 2. In addition, the managed node 112 also has an operating system (OS) module 322 that controls the operation of the applications 324 and other modules that execute on the managed node.

In one embodiment, the managed node 112 has one or more application modules 324 for performing work. The particular the applications 324 on the managed node 112 depend upon the task for which the node is being used. For example, if the managed node 112 is part of a web facing tier of a data center, the applications 324 can include a web server. An application 324 that is executing on the managed node can have one or more processes. Similarly, a process can include one or more threads of execution.

In one embodiment, the managed node 112 includes a QoS agent module 326 that is in communication with the QoS manager 318 in the management node 110. The QoS agent 326 enforces QoS policies received from the QoS manager 318. The QoS agent 326 also gathers information about the implementation of the QoS policy on the managed node 112 and provides the information to the QoS manager 318.

In one embodiment, a QoS driver module 328 in the managed node 112 serves as an abstraction layer between the QoS agent 326 and the specific OS 322, system layer 112, and/or applications 324 presents in the specific managed node 112. In one embodiment, the QoS driver 328 presents a platform-independent API to the QoS agent 326, and converts API calls by the QoS agent into calls specific to the particular embodiment of the managed node 112. The QoS driver 328 thus allows the QoS agent 326 to interact with the managed node 112 in a platform-independent manner, and allows similar versions of the QoS agent 326 to be utilized across heterogeneous managed nodes 112.

Figure 4:
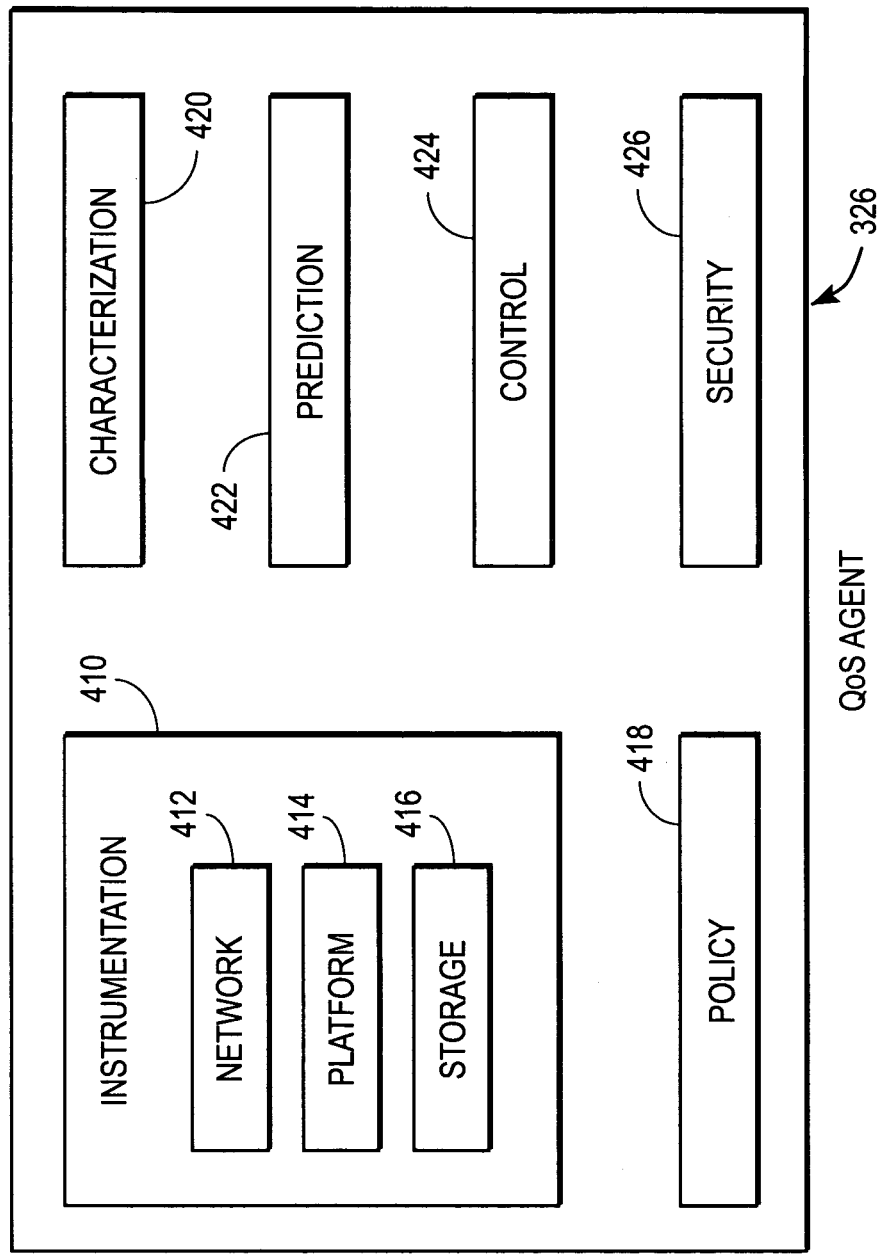
FIG. 4 is a block diagram illustrating a more detailed view of one embodiment of the QoS agent in the managed node.

FIG. 4 is a block diagram illustrating a more detailed view of one embodiment of the QoS agent 326 in the managed node 112. An instrumentation module 410 observes and controls resource usage by the application modules 324. In one embodiment, the instrumentation 410 includes passive instruments (i.e., sensors) and active instruments (i.e., effectors). In one embodiment, the instrumentation 410 is implemented in user mode and/or kernel mode software. In another embodiment, the instrumentation 410 is implemented within the managed node hardware, firmware, and/or the network and storage interfaces. In one embodiment, the instrumentation 410 does not necessarily provide exact observations and controls. Approximate readings and/or controls are adequate and can often be obtained without imposing a performance or efficiency penalty on the resources being instrumented.

In one embodiment, there is instrumentation for the network, platform and storage resources. The network instrumentation 412 observes and/or controls the network resources. In one embodiment, the network instrumentation 412 includes connectivity instrumentation for observing and/or controlling aspects of the network resource related to network connectivity. In one embodiment, the connectivity instrumentation can observe the number of connections established by a process executing on the managed node 112 and/or can observe and control the rate at which connections are established by a process.

In one embodiment, the network instrumentation 412 includes communications instrumentation for observing and/or controlling aspects of the network resource related to network communications. In one embodiment, the communications instrumentation can observe and control the number of bytes sent by a process over a network connection during a given time interval (e.g., bytes/second). Similarly, in one embodiment the communications instrumentation can observe and control the number of packets sent by a process over a network connection during a given time period (e.g., packets/second). In one embodiment, the communications instrumentation can observe and control the number of network connections made by a process during a given time period.

The platform instrumentation 414 observes and/or controls the platform (i.e., system) resources. In one embodiment, the platform instrumentation 414 includes processing instrumentation for observing and/or controlling aspects of the platform related to the processor 202. In one embodiment, the processing instrumentation can observe the associations between applications and processes (e.g., determine which processes are associated with which applications), observe the number of threads associated with each process, observe and control process and/or thread scheduling parameters, and/or observe processor utilization by processes and/or thread.

In one embodiment, the platform instrumentation 414 includes memory instrumentation for observing and/or controlling aspects of platform resources related to memory 206 usage. In one embodiment, the memory instrumentation can observe the working set size (i.e., memory utilized) for each process and/or observe paging activity by each process and/or thread.

In one embodiment, the storage instrumentation 416 observes and/or controls the storage resources. In one embodiment, the storage instrumentation 416 can observe storage connections by process, can observe and control the amount of data accessed to/from storage by a process in a given time interval (e.g. bytes/second), and/or can observe and control the number of input/output (I/O) operations performed by a process in a given time interval (e.g., I/O operations/second). In other embodiments, the network 412, platform 414, and/or storage 416 instrumentation can measure and/or control different and/or other aspects of the resources than the ones described herein.

In one embodiment, a policy module 418 stores QoS policies and/or QoS directives. In one embodiment, the QoS policies are obtained from the QoS policy repository 316 in the management node 110. The QoS manager 318 in the management node 110 may reference the QoS policy repository 316 and pass selected QoS policies (or the QoS manager's interpretation of QoS policies, i.e., QoS directives) to the policy module 418. In another embodiment, the QoS policies are generated on an ad hoc basis by the policy module 418 or another module within the management node 110 and/or the managed node 112. As described above, in one embodiment a QoS policy provides rules expressing relative priorities of applications executed on the managed node 112.

In one embodiment, a characterization module 420 observes and characterizes application resource usage. The characterization module 420 utilizes the instrumentation available in the instrumentation module 410 to observe the managed node 112 resources that are utilized by the applications 324 and/or the threads within the applications. In one embodiment, the characterization module 420 characterizes application resource usage for specified time intervals. For example, the characterization module 420 can determine that a particular application 324 established 50 network connections over a 30 second time period.

In one embodiment, a prediction module 422 generates predictions of application resource usage for future time intervals. In one embodiment, the prediction module 422 generates predictions for the immediate future, although other embodiments make predictions for different times. In one embodiment, the prediction module 422 receives the application resource usage characterizations from the characterization module 420 and utilizes the characterizations to predict resource usage for one or more future time intervals. In one embodiment, the prediction module 422 utilizes time series prediction methods and/or machine learning techniques to predict resource usage for one or more subsequent time periods. Techniques that are used by the prediction module 422 can include neural networks, probabilistic networks, auto regression techniques, stochastic methods, fuzzy logic and neurofuzzy techniques, exponential averaging, and/or other machine learning and/or time series prediction methods.

A control module 424 controls the operation of the managed node 112. In one embodiment, the control module 424 receives the QoS policy from the policy module 418 and the predictions from the prediction module 422 and utilizes these data to adaptively generate QoS envelopes for the one or more applications 324 executing on the managed node 112. In one embodiment, the control module 424 considers the set of resource usage predictions and the QoS policy-determined relative application priorities and generates a QoS envelope for each application for a given time period. The control module 424 can utilize techniques including resource allocation heuristics, fuzzy logic control methods, optimal resource allocation algorithms, and/or any other suitable technique to generate the QoS envelopes. The QoS envelope for an application 324 is thus adaptively generated for each time interval in one embodiment. In one embodiment, the characterization 420, prediction 422, and/or control 424 modules observe and control applications 324 at the level of individual processes and/or threads. In this latter embodiment, the control module 424 can likewise generate adaptive QoS envelopes for applications, processes, and/or threads.

A QoS envelope regulates the managed node resources that an application 324 utilizes. In one embodiment, a QoS envelope specifies the maximum amounts of one or more specific types of resources that an application 324 can utilize within a given time interval. The maximum amount is specified as a soft ceiling, meaning that the application 324 is allowed some leeway in surpassing the maximum. If an application's usage of the resource exceeds the maximum specified by the envelope, in one embodiment the control module 424 utilizes the active instrumentation to meter the application's usage of the resource and thereby gracefully degrade the service level provided to the application 324. In one embodiment, the control module 424 queues the application's excessive resource utilization requests and meters the resource according to the QoS policy.

In one embodiment, the control module 424 works in tandem with the other modules of the QoS agent 326 to function as a closed loop control for the managed node 112. The control module 424 examines the resources consumed by the applications 324 during prior and/or current time intervals and adjusts the QoS envelope for a subsequent interval in order to best allocate the resources of the managed node 112 given the applicable QoS policy. Thus, application resource requests that exceed the QoS envelope can result in increasing future resource usage predictions for that application 324. The increased predictions may lead to an expansion of the QoS envelope for the application and the given resource. Similarly, application resource requests that are below the predicted value for the application 324 can lead to a decrease in future resource usage predictions and a gradual decrease of the application's QoS envelope for the given resource.

In one embodiment, a security module 426 observes resource usage by the applications 324 in order to monitor the managed node 112 for security-related events and/or other malfunctions. In general, a major change in resource usage patterns is a sign that something is wrong with the managed node 112. For example, a typical software worm executing on the managed node 112 will attempt to spread to other computers by opening many network connections. Likewise, an abnormal increase in usage of network and/or other resources can indicate that the managed node 112 is encountering a denial of service attack. Similarly, if a parasitic virus infects an application module 324, the infection might cause an abnormal increase in the consumption of processor usage. Even in the absence of malicious software, abnormally high or low consumption of resources can indicate that there is a problem with the managed node 112, such as a software defect.

In one embodiment, the security module 426 utilizes the instruments in the instrumentation module 410 to directly observe resource consumption. In another embodiment, the security module 426 receives the characterizations from the characterization module 420 and/or the predictions from the prediction module 422. In this latter embodiment, the security module 426 detects deviations between predicted and actual resource consumption. If the deviations exceed a specified threshold, the security module 426 generates a security event.

In one embodiment, the security module 426 sends a message to the QoS manager module 318 to indicate the number and/or type of security events detected at the managed node 112. Depending upon the embodiment, the QoS manager module 318 can log the security alerts, raise an alert to an administrator, and/or perform some other action. In addition, the QoS manager module 318 can correlate security messages from multiple managed nodes 112 in order to determine the magnitude of any security events and appropriate responses.

In one embodiment, the security module 426, the QoS manager module 318, and/or another module takes corrective action in response to the security event. Corrective actions can include terminating the associated application 324, placing a QoS envelope tailored for security around the application, shutting down the managed node 112, etc.

Figure 5:
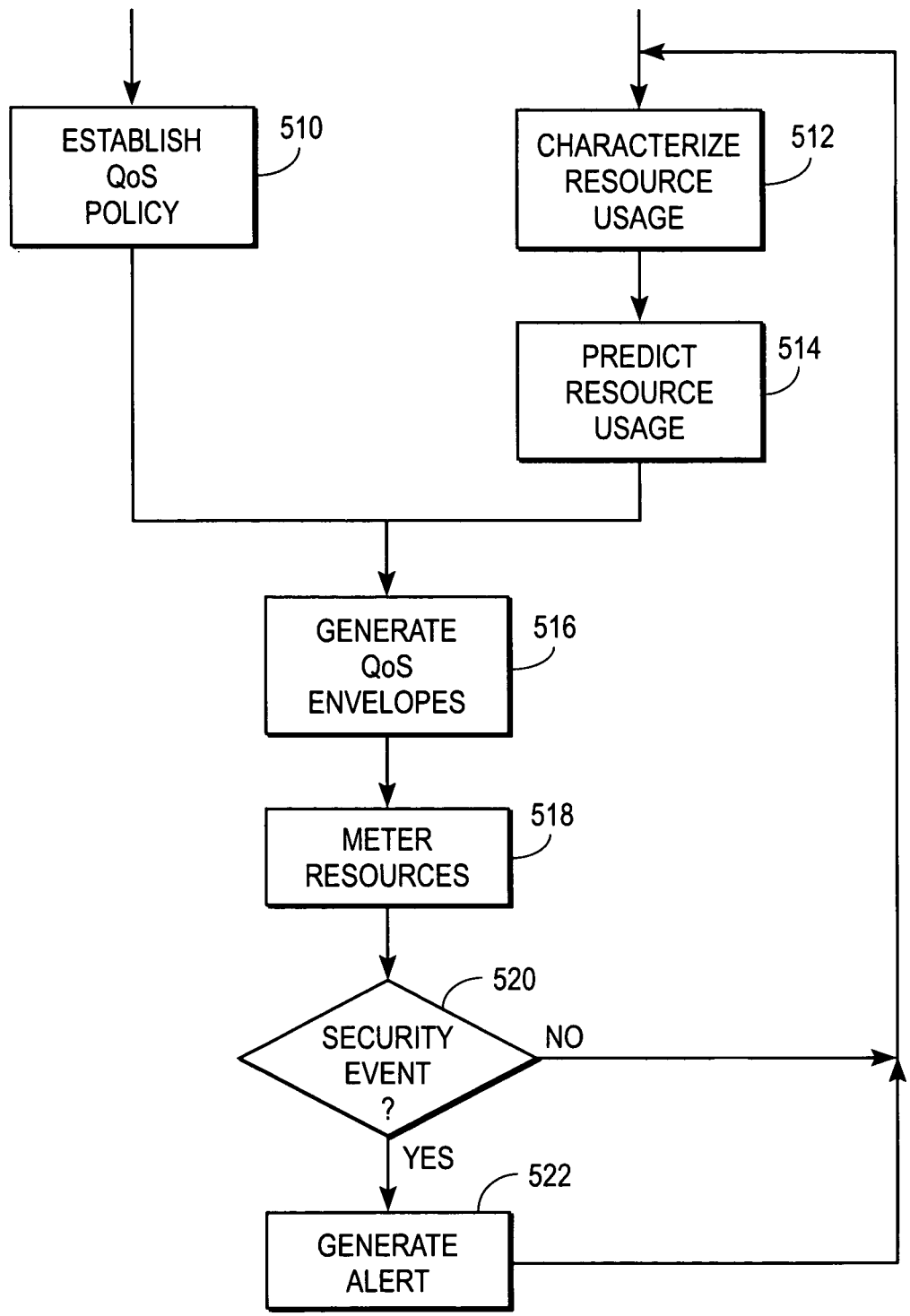
FIG. 5 is a flowchart illustrating steps performed by the QoS agent according to one embodiment.

FIG. 5 is a flowchart illustrating steps performed by the QoS agent 326 according to one embodiment. In some embodiments, other entities within the management node 110 and/or managed node 112 perform some or all of the steps. Similarly, some embodiments perform different steps in addition to, or instead of, the ones described herein. Furthermore, the order of the steps can vary from that described herein.

An administrator, other end-user, and/or automated process establishes 510 a QoS policy for the managed node 112. In one embodiment, the administrator uses the management node 110 to create a QoS policy and store it in the QoS policy repository 316. The management node 110 transfers the QoS policy from the repository 316 to the QoS agent 326 in the managed node 112. In one embodiment, the QoS policy expresses relative priorities of applications executed by the managed node 112.

At some point not necessarily contemporaneous with the establishment 510 of the security policy, the managed node 112 executes one or more applications 324. The QoS agent 326 characterizes resource usage by the applications 324. In one embodiment, the QoS agent 326 characterizes the usage with respect to network, platform, and storage resources.

The QoS agent 326 uses the characterizations to predict 514 future resource usage by the applications 324. The QoS agent 326 analyzes the predictions in view of the established QoS policy and generates 516 QoS envelopes. In one embodiment, the QoS agent 326 generates 516 an envelope for each application 324. A QoS envelope specifies a ceiling on the managed node resources that the associated application 324 can utilize. In one embodiment, the QoS agent 326 generates QoS envelopes that attempt to maximize satisfaction of both the established QoS policy 510 and the resource utilization requests by the applications 324.

The applications 324 execute within the respective QoS envelopes. If an application 324 makes a resource request that exceeds the ceiling specified by its QoS envelope, in one embodiment the QoS agent 326 queues and meters 518 the resource request. Thus, the application 324 is allowed to exceed its QoS envelope if the resources are available, subject to excursionary limits that may be specified by the relevant policy.

In one embodiment, the QoS agent 326 determines 520 whether to generate security events based on application resource utilizations and/or requests. In one embodiment, application resource usage that varies widely from the predicted usage is a sign that something is wrong with the application 324 and/or managed node 112. If the application resource utilization and/or requests warrant, the QoS agent 326 generates 522 an alert. In one embodiment, the QoS agent 326 sends the alert to the management node 110 where it can be logged, reviewed by an administrator, etc.

In one embodiment, the process of characterizing 512 and predicting 514 resource usage, as well has generating QoS envelopes 516 and metering resources 518 repeats indefinitely. The QoS agent 326 adaptively changes the QoS envelopes in view of past behavior and/or future needs. The QoS agent 326 thus maximizes resource usage in view of the established QoS policy and detects potential security events.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A method of managing resources of a computer adapted to execute a plurality of applications, comprising:
   establishing a quality-of-service (QoS) policy for the computer, the QoS policy expressing relative priorities of the plurality of applications;
   characterizing the applications' usages of computer resources;
   predicting, responsive to the characterization, the applications' future usages of the computer resources;
   responsive to the QoS policy and the predictions, establishing QoS envelopes for the applications, the QoS envelopes establishing an upper limit on resource usages by the applications;
   analyzing an application's actual usage of computer resources and the application's predicted usage of computer resources; and
   generating a security event responsive to a difference between the application's actual usage and the application's predicted usage.

2. The method of claim 1, wherein the computer resources include at least one of the group consisting of: network resources, platform resources, and storage resources.

3. The method of claim 1, wherein characterizing the applications' usage of computer resources comprises:
   determining historical usage patterns of the applications' usages of the computer resources.

4. The method of claim 1, wherein predicting the applications' future usages of the computer resources comprises:
   predicting future resource demands by the applications for a future time interval.

5. The method of claim 1, further comprising:
   adaptively changing a QoS envelope for an application responsive to new characterizations, predictions, and/or policies.

6. The method of claim 1, wherein a QoS envelope is associated with a particular application and wherein the QoS envelope specifies an upper limit on the application's usage of a particular resource of the computer.

7. The method of claim 1, wherein a QoS envelope is associated with an application, and further comprising:
   responsive to the application requesting to utilize a resource in excess of the upper limit specified by the associated QoS envelope, queuing the request.

8. A system for managing resources of a computer, comprising:
   a processor for executing computer program modules; and
   a non-transitory computer-readable storage medium storing executable computer program modules comprising:
      a characterization module for characterizing an application's usage of the computer resources;
      a prediction module for predicting the application's future usage of the computer resources responsive to the characterization from the characterization module;
      a control module for adaptively generating a quality-of-service (QoS) envelope for the application responsive to the application's predicted usage of the computer resources; and
      a security module for analyzing the application's characterized usage of resources and the application's predicted usage of resources and generating a security event responsive thereto.

9. The system of claim 8, wherein the computer is adapted to execute a plurality of applications, further comprising:
   a policy module having a QoS policy expressing relative priorities of the plurality of applications;
   wherein the control module generates the QoS envelope for the application responsive to the application's predicted usage of the computer resources and the QoS policy.

10. The system of claim 9, wherein the control module is adapted to adaptively change the QoS envelope responsive to new characterizations, predictions, and/or QoS policies.

11. The system of claim 8, wherein the QoS envelope specifies an upper limit on the application's usage of a computer resource.

12. The system of claim 11, wherein the control module is adapted to queue requests by the application for the computer resource in excess of the upper limit specified by the QoS envelope.

13. The system of claim 12, wherein the control module is further adapted to meter queued requests to access the resource responsive to a QoS policy and/or availability of the resource.

14. The system of claim 8, further comprising:
   an instrumentation module for measuring an application's usage of computer resources;
   wherein the characterization module utilizes the measurements of the instrumentation module to characterize the application.

15. The system of claim 14, wherein the instrumentation module comprises at least one module from the set consisting of:

a network instrumentation module for measuring the application's use of network resources;
a platform instrumentation module for measuring the application's use of processor and/or memory resources; and
a storage instrumentation module for measuring the application's use of storage resources.

16. A non-transitory computer-readable storage medium having executable computer program instructions recorded thereon for managing resources of a computer, the computer program instruction comprising:
a characterization module for characterizing an application's usage of the computer resources;
a prediction module for predicting the application's future usage of the computer resources responsive to the characterization from the characterization module;
a control module for adaptively generating a quality-of-service (QoS) envelope for the application responsive to the application's predicted usage of the computer resources; and
a security module for analyzing the application's characterized usage of resources and the application's predicted usage of resources and generating a security event responsive thereto.

17. The computer-readable storage medium of claim 16, wherein the computer is adapted to execute a plurality of applications, further comprising:
a policy module having a QoS policy expressing relative priorities of the plurality of applications;
wherein the control module generates the QoS envelope for the application responsive to the application's predicted usage of the computer resources and the QoS policy.

18. The computer-readable storage medium of claim 17, wherein the control module is adapted to adaptively change the QoS envelope responsive to new characterizations, predictions, and/or QoS policies.

19. The computer-readable storage medium of claim 16, wherein the QoS envelope specifies an upper limit on the application's usage of a computer resource.

20. The computer-readable storage medium of claim 19, wherein the control module is adapted to queue requests by the application for the computer resource in excess of the upper limit specified by the QoS envelope.

21. The computer-readable storage medium of claim 20, wherein the control module is further adapted to meter queued requests to access the resource responsive to a QoS policy and/or availability of the resource.

22. The computer-readable storage medium of claim 16, further comprising:
an instrumentation module for measuring an application's usage of computer resources;
wherein the characterization module utilizes the measurements of the instrumentation module to characterize the application.

23. The computer-readable storage medium of claim 22, wherein the instrumentation module comprises at least one module from the set consisting of:
a network instrumentation module for measuring the application's use of networking resources;
a platform instrumentation module for measuring the application's use of processor and/or memory resources; and
a storage instrumentation module for measuring the application's use of storage resources.

24. A computer system for managing a plurality of nodes on a computer network, comprising:
a processor for executing computer program modules; and
a non-transitory computer-readable storage medium storing executable computer program modules comprising:
a quality-of-service (QoS) policy repository module for storing a plurality of QoS policies, the QoS policies expressing relative priorities of applications executing on the plurality of nodes; and
a QoS manager module for providing selected QoS policies in the QoS policy repository module to select ones of the plurality of nodes, wherein the QoS manager module is adapted to receive security alerts from the plurality of nodes;
wherein a node receiving a QoS policy from the QoS manager module predicts usage of the node's resources by an application executing on the node and, responsive to the predicted usage and the QoS policy, adaptively generates a QoS envelope for the application.

25. The computer system of claim 24, wherein the QoS manager module is further adapted to correlate the security alerts from the plurality of nodes to determine the magnitude of a security event and/or response thereto.

26. The method of claim 1, wherein predicting the applications' future usages of the computer resources further comprises:
predicting the applications' future usage of the computer resources responsive to prior application request for computer resources that exceeded prior QoS envelopes for the application.

* * * * *